United States Patent
Sodagar

(10) Patent No.: US 12,530,226 B2
(45) Date of Patent: Jan. 20, 2026

(54) METHOD AND APPARATUS FOR SIGNALING INDEPENDENT PROCESSING OF MEDIA SEGMENTS ON CLOUD USING METADATA AND STARTCODE

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 579 days.

(21) Appl. No.: 17/702,089

(22) Filed: Mar. 23, 2022

(65) Prior Publication Data

US 2023/0019558 A1  Jan. 19, 2023

Related U.S. Application Data

(60) Provisional application No. 63/218,817, filed on Jul. 6, 2021.

(51) Int. Cl.
  *G06F 9/48* (2006.01)
  *H04L 67/10* (2022.01)

(52) U.S. Cl.
  CPC ............ *G06F 9/4881* (2013.01); *H04L 67/10* (2013.01)

(58) Field of Classification Search
  CPC ........... G06F 9/4881; G06F 2209/5017; G06F 9/5038; H04L 67/10
  USPC ......................................................... 718/106
  See application file for complete search history.

(56) References Cited

U.S. PATENT DOCUMENTS

| | | | |
|---|---|---|---|
| 6,285,661 B1 * | 9/2001 | Zhu | H04N 7/152 370/260 |
| 8,782,261 B1 * | 7/2014 | Rodriguez | H04H 60/65 709/217 |
| 9,338,209 B1 | 5/2016 | Begen et al. | |
| 10,284,790 B1 * | 5/2019 | Morse | H04N 21/8456 |
| 11,264,048 B1 * | 3/2022 | Stojancic | G10L 25/18 |
| 11,694,303 B2 * | 7/2023 | Lee | G06T 3/4038 382/100 |
| 2005/0249080 A1 * | 11/2005 | Foote | G06F 16/639 |

(Continued)

FOREIGN PATENT DOCUMENTS

JP 2021-7258 A 1/2021

OTHER PUBLICATIONS

"Text of ISO/IEC FDIS 23090-8 Network-based media processing", ISO/IEC JTC1/SC29/WG11 Coding of Moving Pictures and Audio, ISO/IEC JTC1/SC29/WG11 N19062, Jan. 2020, pp. 1-105, Brussels, BE.

(Continued)

*Primary Examiner* — Adam Lee
(74) *Attorney, Agent, or Firm* — Sughrue Mion, PLLC

(57) ABSTRACT

A method and apparatus for performing a step-based operation in a network based media processing (NBMP) workflow. The method includes obtaining a workflow including an input media stream having a plurality of segments, identifying boundaries between the plurality of segments in the input media stream based on one of a metadata based segment boundary signaling or a code based segment boundary signaling and processing the plurality of segments based on the identified boundaries between the plurality of segments.

5 Claims, 6 Drawing Sheets

(56) References Cited

U.S. PATENT DOCUMENTS

| | | | | |
|---|---|---|---|---|
| 2006/0126660 | A1* | 6/2006 | Denney | H04L 47/431 370/468 |
| 2007/0097978 | A1* | 5/2007 | Nakamura | H04L 65/764 375/E7.277 |
| 2007/0106685 | A1* | 5/2007 | Houh | G06F 16/23 707/999.102 |
| 2007/0106693 | A1* | 5/2007 | Houh | G06F 16/78 707/E17.02 |
| 2009/0133093 | A1* | 5/2009 | Hodge | H04N 21/4325 725/137 |
| 2011/0229032 | A1 | 9/2011 | Ranganathan | |
| 2013/0182071 | A1* | 7/2013 | Edwards | H04N 13/128 348/43 |
| 2013/0268688 | A1* | 10/2013 | Galanes | H04L 65/60 709/231 |
| 2013/0272374 | A1* | 10/2013 | Eswaran | H04N 21/2343 375/E7.168 |
| 2014/0270691 | A1* | 9/2014 | Yang | G11B 27/28 386/230 |
| 2014/0282722 | A1* | 9/2014 | Kummer | H04N 5/76 725/35 |
| 2015/0163273 | A1* | 6/2015 | Radcliffe | H04L 43/0894 709/231 |
| 2015/0195327 | A1* | 7/2015 | Bouazizi | H04L 65/612 709/219 |
| 2015/0325243 | A1* | 11/2015 | Grant | H03G 9/025 |
| 2016/0014482 | A1* | 1/2016 | Chen | H04N 21/8456 386/241 |
| 2016/0261663 | A1* | 9/2016 | Lotfallah | H04L 65/65 |
| 2016/0261677 | A1* | 9/2016 | Lotfallah | H04L 67/02 |
| 2016/0316235 | A1 | 10/2016 | Van Veldhuisen | |
| 2016/0323606 | A1* | 11/2016 | Mao | H04N 21/64707 |
| 2017/0064344 | A1* | 3/2017 | Petersen | H04N 21/44004 |
| 2017/0085897 | A1* | 3/2017 | Narasimhan | H04N 21/2353 |
| 2017/0094341 | A1* | 3/2017 | Berner | H04N 21/44209 |
| 2017/0142481 | A1* | 5/2017 | Caruana | H04N 21/233 |
| 2018/0091567 | A1* | 3/2018 | Bekiares | H04L 65/611 |
| 2018/0176616 | A1* | 6/2018 | Green | H04N 21/235 |
| 2018/0262951 | A1* | 9/2018 | Jiang | H04W 28/065 |
| 2018/0270511 | A1* | 9/2018 | Kipp | H04N 21/8547 |
| 2020/0020077 | A1* | 1/2020 | You | H04N 23/698 |
| 2020/0092530 | A1* | 3/2020 | Wang | H04N 23/90 |
| 2020/0120383 | A1* | 4/2020 | Edwards | H04N 21/4402 |
| 2020/0226716 | A1* | 7/2020 | Um | H04N 23/698 |
| 2020/0304423 | A1 | 9/2020 | Sodagar et al. | |
| 2020/0304508 | A1* | 9/2020 | Bae | H04L 63/0876 |
| 2021/0004273 | A1* | 1/2021 | You | G06F 9/5027 |
| 2021/0021659 | A1* | 1/2021 | Takabayashi | H04L 65/756 |
| 2021/0065719 | A1* | 3/2021 | Wang | G06F 16/783 |
| 2021/0099403 | A1 | 4/2021 | Sodagar | |
| 2021/0105338 | A1* | 4/2021 | Oyman | H04L 12/2876 |
| 2021/0120061 | A1* | 4/2021 | Labrozzi | H04N 21/26258 |
| 2021/0211637 | A1* | 7/2021 | Wang | H04N 13/282 |
| 2021/0258632 | A1* | 8/2021 | Hoffmann | H04N 21/6106 |
| 2021/0390318 | A1* | 12/2021 | You | G06V 20/49 |
| 2022/0053244 | A1* | 2/2022 | Bae | H04N 21/64784 |
| 2022/0053474 | A1* | 2/2022 | Vaidya | H04W 72/21 |
| 2022/0070750 | A1* | 3/2022 | Yamagishi | H04L 65/1095 |
| 2022/0076706 | A1* | 3/2022 | Walker | G06F 3/0482 |
| 2022/0086138 | A1* | 3/2022 | Kammachi Sreedhar | H04L 9/3247 |
| 2022/0124139 | A1* | 4/2022 | Yamagishi | H04L 67/101 |
| 2022/0164453 | A1* | 5/2022 | Kammachi Sreedhar | G06F 21/10 |
| 2022/0167023 | A1* | 5/2022 | Yamagishi | H04N 21/64322 |

OTHER PUBLICATIONS

International Search Report dated Aug. 18, 2022 in Application No. PCT/US2022/024541.

Written Opinion of the International Searching Authority dated Aug. 18, 2022 in Application No. PCT/US2022/024541.

Yosef Hasan Jbara, "Data Reduction in MMBD Computing" Multimedia Big Data Computing for IoT Applications, Springer, Singapore, 2020, Mar. 6, 2021, Retrieved on Jul. 22, 2022 (Jul. 22, 2022) from <https://link.springer.com/chapter/10.1007/978-981-13-8759-3_8> pp. 217-245 (29 pages total).

Communication dated Oct. 1, 2024, issued in Japanese Application No. 2023-523216.

* cited by examiner

METHOD AND APPARATUS FOR SIGNALING INDEPENDENT PROCESSING OF MEDIA SEGMENTS ON CLOUD USING METADATA AND STARTCODE

CROSS-REFERENCE TO RELATED APPLICATION

This application is based on and claims priority to U.S. Provisional Patent Application No. 63/218,817, filed on Jul. 6, 2021, the disclosure of which is incorporated by reference herein in its entirety.

FIELD

Embodiments of the disclosure relate to apparatuses and methods for performing a step-based operation in media processing on a cloud platform.

BACKGROUND

A network and cloud platform may be used to run various applications. The Network Based Media Processing (NBMP) standard provides a specification for defining, instantiating, and running workflows on cloud platforms. The NBMP standard also includes a set of tools for independently processing media segments with equal duration. For instance, the NBMP step descriptor provides information about a function step-based operation support. Here, the NBMP step descriptor may define the segment maximum duration/size and operational units among other parameters. However, the step descriptor functionality of the NBMP standard does not have segment boundaries defined. One or more example embodiments of the disclosure may solve this issue and provide functionality to process input and output in the step descriptor properly by defining the segment boundaries.

SUMMARY

One or more example embodiments of the disclosure provide a method and an apparatus for providing the step descriptor functionality by defining the segment boundaries.

According to an aspect of the disclosure, there is provided a method for performing a step-based operation in media processing on a cloud platform, the method including: obtaining a workflow including an input media stream, the input media stream having a plurality of segments, identifying boundaries between the plurality of segments in the input media stream based on one of a metadata based segment boundary signaling or a code based segment boundary signaling and processing the plurality of segments based on the identified boundaries between the plurality of segments.

According to another aspect of the disclosure, there is provided an apparatus for performing a step-based operation in media processing on a cloud platform, the apparatus including: at least one memory configured to store program code; and at least one processor configured to read the program code and operate as instructed by the program code, the program code including: obtaining code configured to cause the at least one processor to obtain a workflow including an input media stream, the input media stream including a plurality of segments, identifying code configured to cause the at least one processor to identify boundaries between the plurality of segments in the input media stream based on one of a metadata based segment boundary signaling or a code based segment boundary signaling and processing code configured to cause the at least one processor to process the plurality of segments based on the identified boundaries between the plurality of segments.

According to another aspect of the disclosure, there is provided a non-transitory computer readable medium storing instructions, the instructions including: one or more instructions that, when executed by at least one processor of an apparatus for performing a step-based operation in media processing on a cloud platform, cause the at least one processor to: obtaining a workflow including an input media stream, the input media stream having a plurality of segments, identifying boundaries between the plurality of segments in the input media stream based on one of a metadata based segment boundary signaling or a code based segment boundary signaling and processing the plurality of segments based on the identified boundaries between the plurality of segments.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

Figure 1:
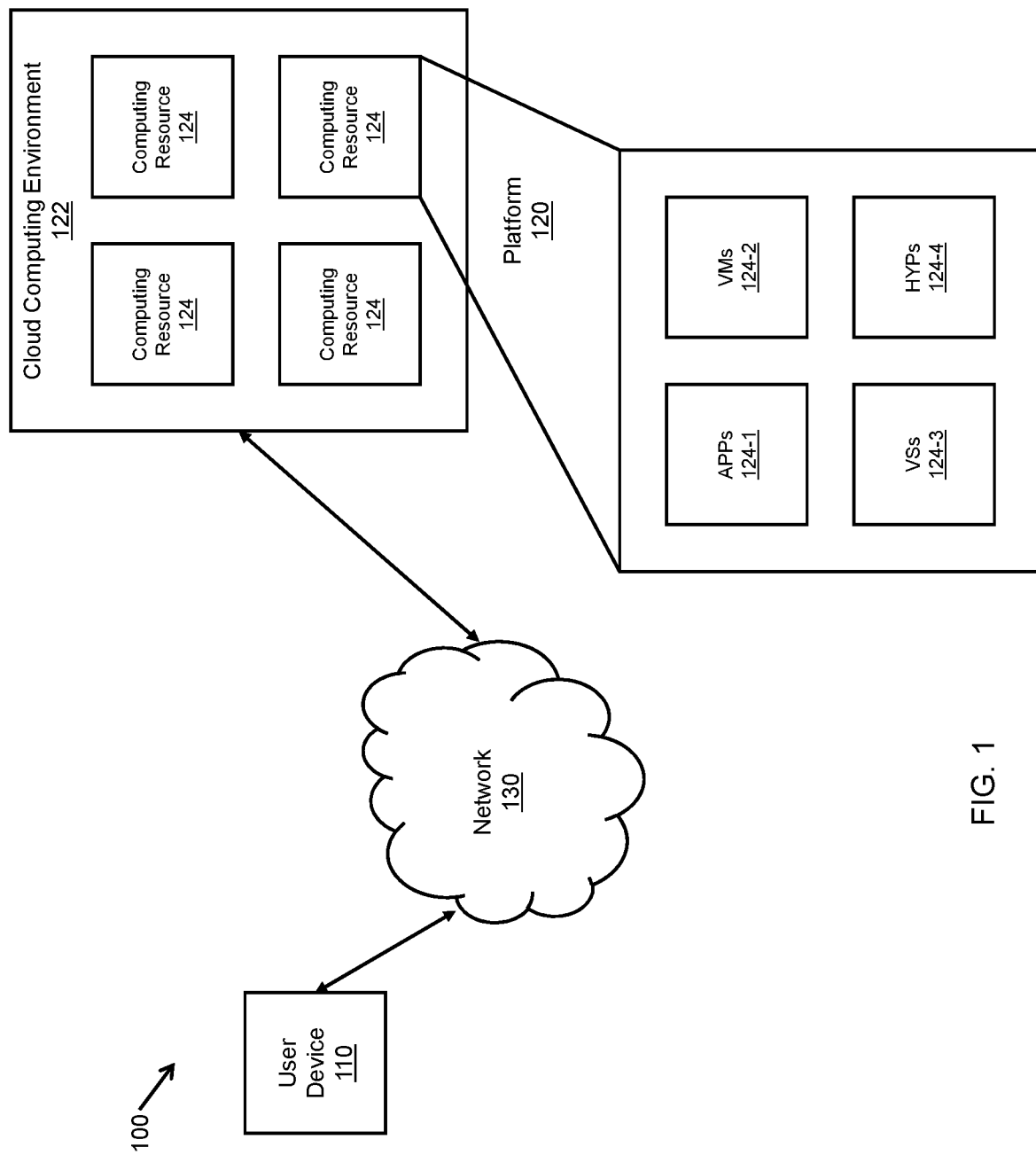
FIG. 1 is a schematic illustration of a communication system, according to one or more embodiments.

Embodiments of the disclosure relates to a method and an apparatus for signaling modifications in a network based media processing (NBMP) workflow, in particular, to apparatuses and methods for performing a step-based operation in media processing on a cloud platform.

Embodiments of the disclosure are exemplary in nature, and are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented in the form of hardware, which may include processing circuitry (e.g., one or more processors or one or more integrated circuits) or microcontroller apparatuses, implemented in the form of software, implemented in different networks and/or processor apparatuses or implemented by a combination of hardware and software components. In one example, the one or more processors execute computer program code that is stored in a one or more non-transitory computer-readable media.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 may include one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 may include one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 may include an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 may include one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like. However, the disclosure is not limited thereto, and as such, according other example embodiment, the computing resource 124 may include other type of cloud resources.

The application 124-1 may include one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 may include a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
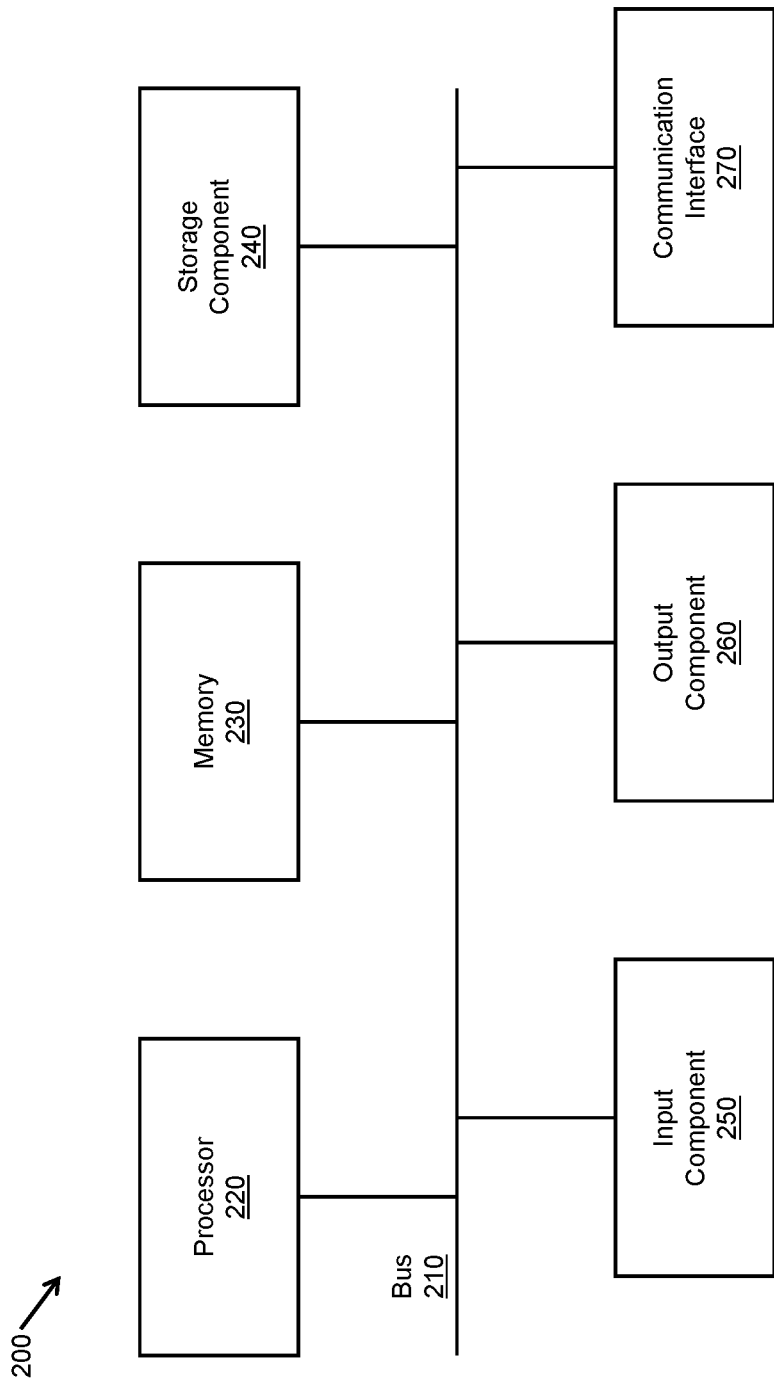
FIG. 2 is a simplified example illustration of a streaming environment, according to one or more embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 may include a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 may include a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
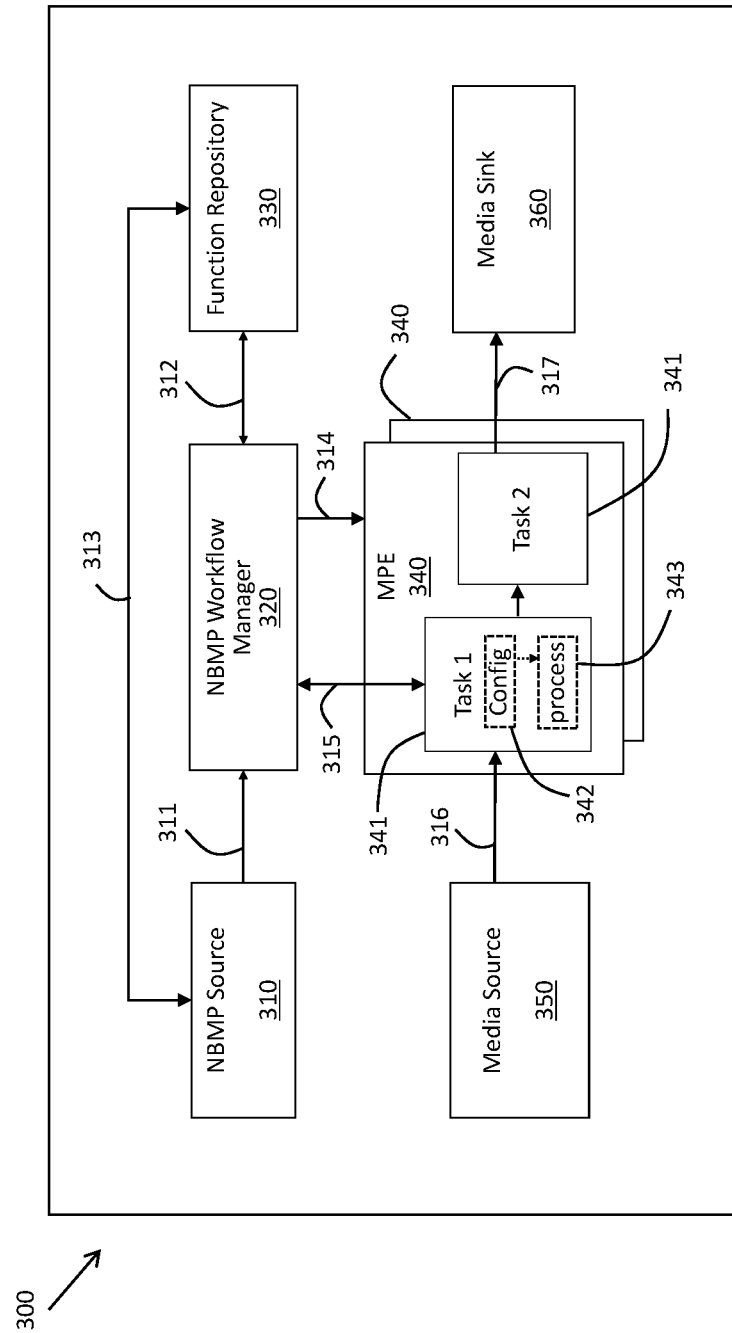
FIG. 3 is a block diagram of an NBMP system, according to one or more embodiments.

In an embodiment of the disclosure, a Network-Based Media Processing (NBMP) system is provided. FIG. 3 illustrates a NBMP architecture 300 according to embodiments herein and may be implemented with respect to cloud processing. The NBMP system 300 comprises an NBMP source 310, an NBMP workflow manager 320, a function repository 330, one or more media processing entities (MPE) 340, a media source 350, and a media sink 360. The NBMP source 310, NBMP workflow manager 320, function repository 330, MPE 340, media source 350, and media sink 360 may include or be implemented by at least one or more processors and memory that store code configured to cause the at least one or more processors to perform the functions of the NBMP source 310, NBMP workflow manager 320, function repository 330, MPE 340, media source 360, and media sink 360, respectively.

The NBMP source 310 may communicate work flow descriptions with the NBMP workflow manager 320 via a NBMP workflow API 311. The NBMP source 310 may also communicate function descriptions with the function repository 330 via a function discovery API 313. For example, the NBMP source 310 may send workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP workflow manager 320 may communicate with the function repository 330 via a function discovery API 312, which may be a same or different API from the function discovery API 313, and may communicate with one or more of the MPE 340 via an API 314 (e.g. an MPE API).

The media processing entities (MPE) 340 may include one or more tasks 341. The NBMP workflow manager 320 may also communicate with the tasks 341 via API 315 (e.g. an NBMP Task API). The NBMP workflow manager 320 may use the API 315 to setup, configure, manage, and monitor one or more tasks 341 of a workflow that is performable by the one or more MPE 340. In order to configure, manage, and monitor tasks 341 of the workflow, the NBMP workflow manager 320 may send messages, such as requests, to one or more of the MPE 340 and/or the tasks 341, wherein each message may have several descriptors, each of which have several parameters. Additionally, the communications between the NBMP source 310, the NBMP workflow manager 320, the function repository 330, and the MPE 340 may be considered a control flow.

The tasks 341 may each include media processing functions 343 and configurations 342 for the media processing functions 343. Each of the tasks 341 in a respective media processing entity 340 may also communicate with each other facilitating data flow between tasks. In an embodiment, the NBMP workflow manager 320 may select the tasks based on the descriptions of the tasks in the WDD to search the function repository 330, via the function discovery API 312, to find the appropriate functions to run as tasks 341 for a current workflow. The one or more MPE 340 may be configured to receive media content from the media source 350, process the media content in accordance with the workflow, that includes tasks 341, created by the NBMP workflow manager 320, and output the processed media content to the media sink 360. In an embodiment, the one or more MPE 340 may be provided in parallel for multiple media flows 316 and 317 between the media source 350 and the media sink 360, respectively The media source 350 may include memory that stores media and may be integrated with or separate from the NBMP source 310. In an embodiment, the NBMP workflow manager 320 may notify the NBMP source 310 when a workflow is prepared and the media source 350 may transmit media content to the one or more MPE 340 based on the notification that the workflow is prepared and the one or more MPE 340 may transmit the media content to the media sink 360. The communications between the media source 350, the MPE 340, and the media sink 360 may be considered a data flow.

Figure 4:
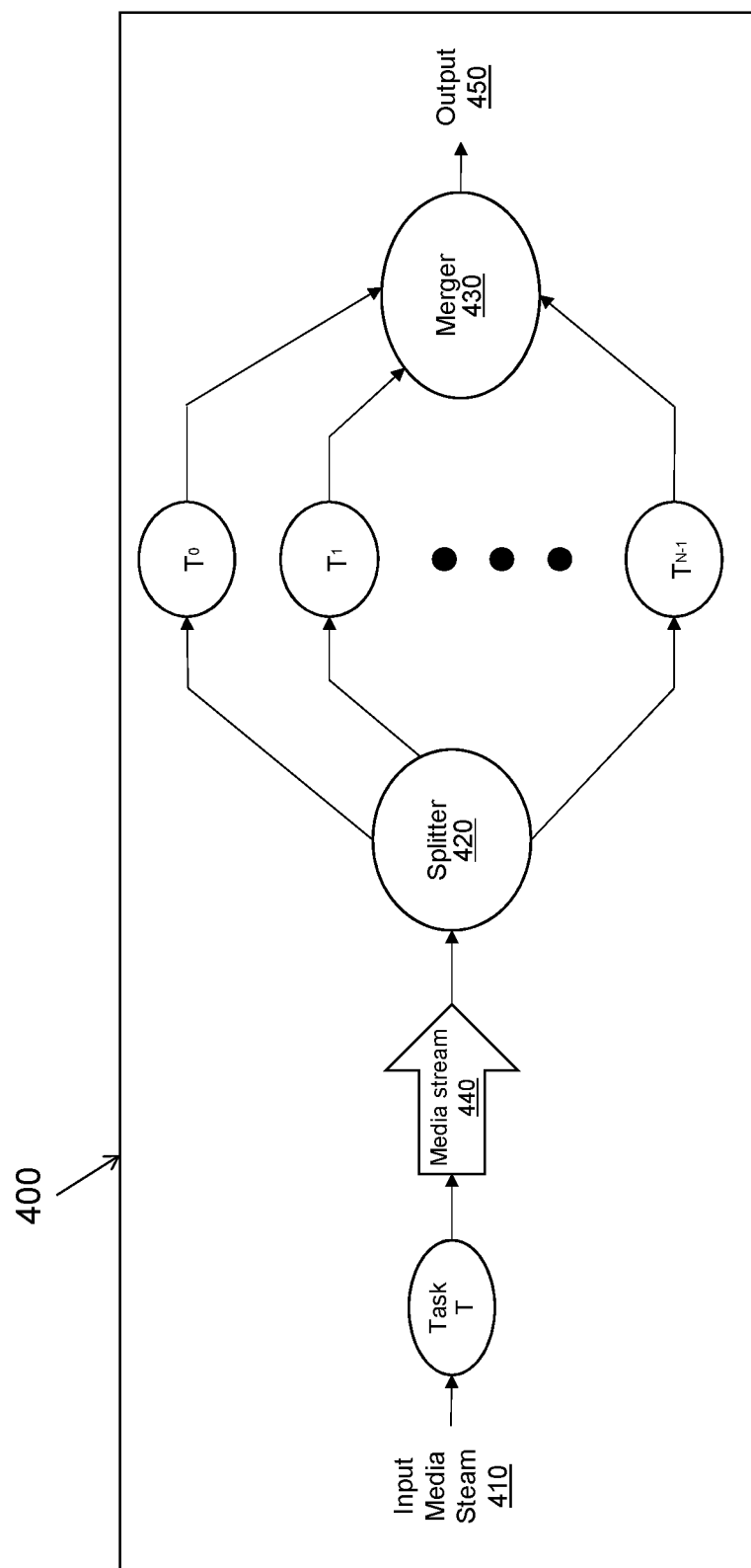
FIG. 4 is an example diagram of an NBMP splitter and merger process according to one or more embodiments.

FIG. 4 shows an example of NBMP splitting and merging segments of a media stream 440 of Task T for parallel processing according to an embodiment of the disclosure. As shown in FIG. 4, the NBMP splitter and merger process 400 includes a splitter 420 and a merger 430. In FIG. 4, Task T of an input media stream is converted to n instances of Task T (i.e., $T_0, \ldots, T_{N-1}$) with the n instances running in parallel. The input media stream 410 may be continuous. The splitter 420 converts the media stream to N media sub-streams. Each sub-stream is processed by an instance of T. The merger 430 then interleaves the sub-streams together to generate an output 450. The output 450 is the equivalent of the output stream of the Task T (i.e., media stream 440).

The 1:N splitter 420 and N:1 merger 430 functions, as shown in FIG. 4, work on the segment boundaries. Each segment has a start, duration, and length metadata associated with it. Since the segments are independent, consequently the sub-streams are independent of each other in terms of being processed by the Task T. In embodiments, Task $T_0, \ldots, T_{N-1}$, are instances of the task T and may process the segments at the same time or separately. Since the segments and sub-streams are independent, each instance of Task T (i.e., $T_0, \ldots, T_{N-1}$) may run at its own speed.

According to embodiments of the disclosure, methods for signaling the segment boundaries are described. These methods may include a metadata method or a startcode method. According to embodiment, the signaling of the segment boundaries are needed in the NBMP step descriptor for better support of the step-based operation in media processing on a cloud platform. According to an embodiment, the NBMP step descriptor may provide information about a function step-based operation support. Here, the functions may have information, such as a descriptor, indicating whether the function can be operated in a step mode, in which, independent and/or parallel processing may be performed based on the defined segments. The descriptor may define the segment maximum duration/size and operational units among other parameters.

[Metadata method]

According to an embodiment of the disclosure, in a method for signaling the segment boundaries using metadata, metadata maybe provided to define the segment start, segment duration and the segment size. Such a definition may be provided for any of the segments of Task T. For example, metadata definition may be as follows:

S: start of the segment in T scale.
D: duration of the segment in T scale.
L: Length of the segment in bytes
T: timescale (number of ticks in second)

According to the metadata based signal method, media stream input or output of any function shall have a corresponding metadata input or output that carries the segment boundaries metadata. As such, the splitting and merging segments of a media stream 440 of Task T for parallel processing may be performed properly when the step-based operation is performed in media processing on a cloud platform.

[Startcode Method]

According to an embodiment of the disclosure, a startcode based method may for signaling the segment boundaries may be provided instead of the metadata method. According to a signaling method using a startcode, a startcode may be given for a start of each segment. In this case, the media stream input may indicate the startcode given for each segment. Also, the media stream output may indicate the startcode given for each segment.

According to the startcode based signal method, media stream input or output of any function shall have a corresponding metadata input or output that carries a starcode that identifies the segment boundaries. As such, the splitting and merging segments of a media stream 440 of Task T for parallel processing may be performed properly using the startcode when the step-based operation is performed in media processing on a cloud platform.

According to an embodiment, by providing an identical starting pattern (i.e., startcode) for each of the input segments, the process for splitting and merging segments may be easily identify the boundaries of the segments. As such, start time and duration information of each segment (as with the metadata based method) is not be needed to signal the segment boundaries.

Although a startcode indicating a start of the segment is provided according to an embodiment, the disclosure is not limited to a startcode. As such, according to other embodiments, patterns or codes may be provided at a different location input and output streams to indicate the boundary segments. For instance, a code, such as an endcode, may be provided at an end of the segment to define the boundary between the segments.

According to an example embodiment, the step descriptor of NBMP Standard specification may be extended in the following manner:

TABLE 1

Step Descriptor

| Name | Type | Cardinality |
| --- | --- | --- |
| step-mode | P | 0-1 |
| segment-durati on | P | 0-1 |
| segment-metadata | P | 0-1 |
| segment-startcode | P | 0-1 |
| operation-units | P | 0-1 |
| temporal-overlap | P | 0-1 |
| number-of-dimensions | P | 0-1 |
| high-dimension-segment-divisor | P | 0-1 |
| high-dimension-segment-descriptions | P | 0-1 |
| high-dimension-segment-ordering | P | 0-1 |
| high-dimension-overlap | P | 0-1 |

For instance, segment-metadata descriptor and segment-startcode descriptor may be added to the step descriptor of NBMP Standard specification.

Moreover, according to an example embodiment, the step descriptor parameters of NBMP Standard specification may be extended in the following manner:

TABLE 2

Step Descriptor Parameters

| Name | Definition | Unit | Type | Valid range |
| --- | --- | --- | --- | --- |
| step-mode | Running mode with the following values: 'stream': continuous execution 'stateful': maintain the state of tasks at end each step 'stateless': run in stateless mode without the need for maintaining state The default value is 'stream'. | N/A | string | N/A |
| segment-duration | duration for which the output(s) of resource are independent to any inputs outside of the corresponding duration. | microseconds | number | unsigned integer |
| operation-units | number of segment-duration the resource is operating in a stateless fashion | N/A | number | unsigned integer |

TABLE 2-continued

Step Descriptor Parameters

| Name | Definition | Unit | Type | Valid range |
| --- | --- | --- | --- | --- |
| segment-metadata | If 'TRUE', this function supports receiving/providing segment metadata for each media input/output to detect the segment boundaries. The default value is 'FALSE" | N/A | boolean | N/A |
| segment-startcode | If 'TRUE', this function supports receiving/providing startcode for each media input/output to detect the segment boundaries. The default value is 'FALSE" | N/A | boolean | N/A |
| temporal-overlap | determines the size of overlap between segments. The default value is 0. | N/A | number | unsigned integer |
| number-of-dimension | number of dimensions of a segment other than temporal. The default value is 0 | N/A | number | unsigned integer |
| high-dimension-segment-divisors | array defining the divisors of the segment in the higher dimensions. Each element is an unsigned non-zero integer. *The unit of divisor in each dimension depends on the unit of media on that dimension. For instance, the unit for spatial dimensions is the pixel, and the unit for color components is the color component index. The arraysize is equal to 'number-of-dimensions' | varies *see the description | Array of number | unsigned integer |
| higher-dimensions-descriptions | description of each other dimension. The array size is equal to 'number-of-dimensions'. Each element is a string. The following values are defined in this document: 'width': width of the video frame 'height': height of the video frame 'RGB': color components R, G, and B, where R, G and B components are defined by index 0, 1, and 2 respectively. 'depth': image (not a depth map) and depth-map*, where image and depth-map are defined by index 0, 1, and 2 respectively. 'YUV': color components Y, U, V where Y, U and V components are defined by index 0, 1, and 2 respectively. 'V-PCC': V-PCC components patch, geometry, occupancy, and attribute, where patch, geometry, occupancy, and attribute are defined by index 0, 1, 2 and 3 respectively. | N/A | Array of string | N/A |

TABLE 2-continued

Step Descriptor Parameters

| Name | Definition | Unit | Type | Valid range |
|---|---|---|---|---|
| higher-dimensions-segment-order | The split/merge order for segments of the same time instance. The array shows the order of different dimensions. The value is an array element is the dimension index starting from zero. A dimension located in the array's element n + 1 is nested in the dimension located in the array element n. The array size is equal to 'number-of-dimensions'. | Unsigned integer | Array of number | N/A |
| high-dimension-overlap | The size of overlap at each dimension other than temporal. The array size is equal to 'number-of-dimensions'. Each element is an unsigned integer. When the given overlap value is greater than the size of the segment, the original data shall be used than the segment | Unsigned integer | Array of number | N/A |
| high-dimension-operation-units | The number of segments of the resource in each dimension for operating in a stateless fashion. The array size is equal to 'number-of-dimensions'. Each element is an unsigned nonzero integer. The default value is an array of 1s. | Unsigned integer | Array of number | N/A |

For instance, parameters for segment-metadata descriptor and segment-startcode descriptor may be added to the step descriptor parameters of NBMP Standard specification.

According to an example embodiment, the segment-metadata descriptor may be of a boolean type, and have the following definition: If 'TRUE', this function supports receiving/providing segment metadata for each media input/output to detect the segment boundaries. The default value may be 'FALSE'.

According to an example embodiment, the segment-startcode descriptor may be of a boolean type, and have the following definition: If 'TRUE', this function supports receiving/providing startcode for each media input/output to detect the segment boundaries.

According to an example embodiment, the method for identifying segment boundaries may include determining whether one of the segment-metadata or the segment-startcode description is true, and based on a determination that the segment-metadata is TRUE, identify that the segment boundaries are identified using the metadata method, and based on a determination that the segment-startcode is TRUE, identify that the segment boundaries are identified using the startcode method.

Figure 5:
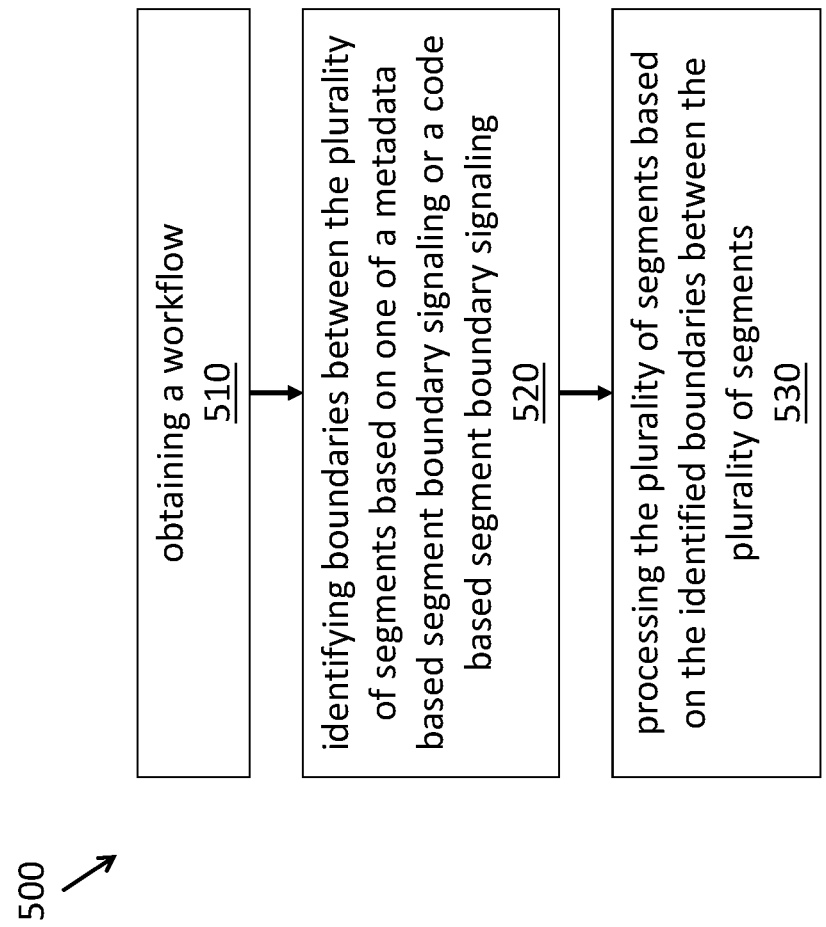
FIG. 5 is a block diagram of an example process for performing a step-based operation in media processing on a cloud platform according to one or more embodiments.

FIG. 5 is a flowchart of an example method 500 for performing a step-based operation in a network based media processing (NBMP) workflow according to one or more embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes obtaining a workflow. Here, the workflow may be include an input media stream, and the input media stream may include a plurality of segments;

In operation 520, the method 500 includes identifying boundaries between the plurality of segments in the input media stream based on one of a metadata based segment boundary signaling or a code based segment boundary signaling. According to an embodiment, the code based segment boundary signaling may include a startcode given at a start of each segment to indicate the boundaries between the plurality of segments.

In operation 530, the method 500 includes processing the plurality of segments based on the identified boundaries between the plurality of segments.

According to an embodiment, the method 500 may further include generating a modified workflow splitting the plurality of segments into one or more tasks for independent processing of the modified workflow. The one or more tasks of the modified workflow are processed in parallel.

According to an embodiment, the method 500 may further include, in the code based segment boundary signaling, receiving a code corresponding to the plurality of segments in the input media stream, and determining that each time the code appears in the input media stream, the code indicates a boundary between adjacent segments.

According to an embodiment, the method 500 may further include determining whether the input media stream supports one of the metadata based segment boundary signaling or the code based segment boundary signaling.

According to an embodiment, the method 500 may further include providing a first flag corresponding to the metadata based segment boundary signaling, and providing a second flag corresponding to the code based segment boundary signaling.

According to an embodiment, the method 500 may further include merging one or more outputs from the processing one or more tasks of the modified workflow to generate an output media stream.

According to an embodiment, the method 500 may further include applying one of the metadata based segment boundary signaling or the code based segment boundary signaling to the output media stream.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

Figure 6:
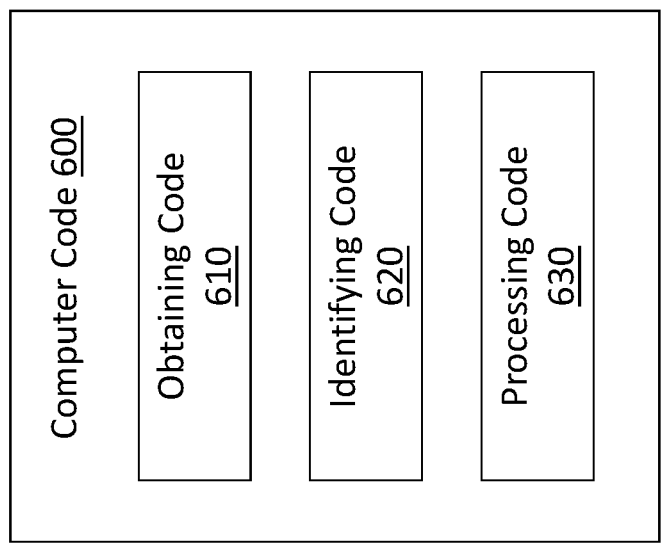
FIG. 6 is a block diagram of an example of computer code for performing a step-based operation in media processing on a cloud platform according to one or more embodiments.

FIG. 6 is a block diagram of an example of computer code for performing a step-based operation in a network based media processing (NBMP) workflow according to one or more embodiments.

According to embodiments of the disclosure, at least one processor with memory storing computer code may be provided. The computer code may be configured to, when executed by the at least one processor, perform any number of aspects of the disclosure.

For example, with reference to FIG. 6, computer code 600 may be implemented in the NBMP system 300.

As shown in FIG. 6, the computer code 600 may include obtaining code 610, identifying code 620, and processing code 630.

The obtaining code 610 may be configured to cause the at least one processor to obtain a workflow. The workflow may include an input media stream, and the input media stream may include a plurality of segments.

The identifying code 620 may be configured to cause the at least one processor to identify boundaries between the plurality of segments in the input media stream based on one of a metadata based segment boundary signaling or a code based segment boundary signaling.

The processing code 630 may be configured to cause the at least one processor to process the plurality of segments based on the identified boundaries between the plurality of segments.

Although FIG. 6 shows example blocks of the computer code 600 of an apparatus or device according to embodiments, in some implementations, the apparatus may include additional blocks, fewer blocks, different blocks, or differently arranged blocks than those depicted in FIG. 6. Additionally, or alternatively, two or more of the blocks of the apparatus may be combined.

The techniques for performing a signaling for segment boundaries in a step-based operation in a network based media processing (NBMP) workflow described above may be used separately or combined in any order. Further, each of the methods (or embodiments) may be implemented by processing circuitry (e.g., one or more processors or one or more integrated circuits). In one example, the one or more processors may execute a program that is stored in a non-transitory computer-readable medium.

The disclosure provides illustration and description, but is not intended to be exhaustive or to limit the implementations to the precise form disclosed. Modifications and variations are possible in light of the disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for performing a step-based operation in media processing on a cloud platform, the method comprising:
    obtaining a workflow including an input media stream, the input media stream comprising a plurality of segments, and the workflow is a network based media processing (NBMP) workflow;
    generating a modified workflow by splitting the plurality of segments into a plurality of tasks for independent and parallel processing of the modified workflow;
    performing the step-based operation in the media processing on the cloud platform by at least:
        processing, in parallel, the plurality of segments based on boundaries between the plurality of segments, the boundaries based on metadata based segment boundary signaling or a code based segment boundary signaling, and
        processing step parameters of metadata of the plurality of segments comprising at least a step-mode parameter, a segment-duration parameter, an operation-units parameter, a segment-metadata parameter, a segment-startcode parameter, a temporal-overlap parameter, and a number-of-dimension parameter, wherein:
        the segment-metadata parameter indicates that if a value of the segment-metadata is set as true, then any of receiving and providing segment metadata for each media input/output of the input media stream to detect indicate the boundaries is supported, and if set as false, is not supported, and the default value of the segment-metadata parameter is false, and
        the segment-startcode parameter indicates that if a value of the segment-startcode is set as true, then any of receiving and providing a startcode for each of the media input/output of the input media stream to indicate the segment boundaries is supported, and if set as false, is not supported, and the default value of the segment-startcode parameter is false;
    merging outputs from processing the plurality of tasks of the modified workflow to generate an output media stream;
    setting a first flag corresponding to the metadata based segment boundary signaling and applying the metadata based segment boundary signaling to the output media stream;
    setting a second flag corresponding to the code based segment boundary signaling and applying the code based segment boundary signaling to the output media stream; and
    receiving a code corresponding to each of the plurality of segments in the input media stream, the code comprising a startcode at a start of each segment to indicate the boundaries between the plurality of segments, the startcode being a NBMP step descriptor,
    and each time the code appears in the input media stream, the code indicates a boundary between adjacent segments.

2. The method of claim 1, further comprising:
    obtaining a second NBMP workflow including a second input media stream, the second input media stream comprising a second plurality of segments; and
    performing the step-based operation in the media processing on the cloud platform by at least processing, in parallel, the second plurality of segments based on boundaries between the second plurality of segments based on the segment boundary signaling and by a second processing of the step parameters of metadata of the second plurality of segments, and the second input media stream supports one of the metadata based segment boundary signaling or the code based segment boundary signaling.

3. An apparatus for performing a step-based operation in media processing on a cloud platform, the apparatus comprising:
at least one memory configured to store program code; and
at least one processor configured to read the program code and operate as instructed by the program code, the program code including:
obtaining code configured to cause the at least one processor to obtain a workflow including an input media stream, the input media stream comprising a plurality of segments, and the workflow is a network based media processing (NBMP) workflow;
generating code configured to cause the at least one processor to generate a modified workflow by splitting the plurality of segments into a plurality of tasks for independent and parallel processing of the modified workflow;
processing code configured to cause the at least one processor to perform the step-based operation in the media processing on the cloud platform by at least:
processing, in parallel, the plurality of segments based on boundaries between the plurality of segments, the boundaries based on metadata based segment boundary signaling or a code based segment boundary signaling, and
processing step parameters of metadata of the plurality of segments comprising at least a step-mode parameter, a segment-duration parameter, an operation-units parameter, a segment-metadata parameter, a segment-startcode parameter, a temporal-overlap parameter, and a number-of-dimension parameter, wherein:
the segment-metadata parameter indicates that if a value of the segment-metadata is set as true, then any of receiving and providing segment metadata for each media input/output of the input media stream to indicate the boundaries is supported, and if set as false, is not supported, and the default value of the segment-metadata parameter is false, and
the segment-startcode parameter indicates that if a value of the segment-startcode is set as true, then any of receiving and providing a startcode for each of the media input/output of the input media stream to indicate the segment boundaries is supported, and if set as false, is not supported, and the default value of the segment-startcode parameter is false; and
further code configured to cause the at least one processor to merge outputs from processing the plurality of tasks of the modified workflow to generate an output media stream;
first setting code configured to cause the at least one processor to set a first flag corresponding to the metadata based segment boundary signaling and apply the metadata based segment boundary signaling to the output media stream;
second setting code configured to cause the at least one processor to set a second flag corresponding to the code based segment boundary signaling and apply the code based segment boundary signaling to the output media stream; and the further code is further configured to cause the at least one processor to:
receive a code corresponding to each of the plurality of segments in the input media stream, the code comprising a startcode at a start of each segment to indicate the boundaries between the plurality of segments, the startcode being a NBMP step descriptor,
and each time the code appears in the input media stream, the code indicates a boundary between adjacent segments.

4. The apparatus of claim 3, further comprising:
the obtaining code is further configured to cause the at least one processor to obtain a second NBMP workflow including a second input media stream, the second input media stream comprising a second plurality of segments; and
the performing code is further configured to cause the at least one processor to perform the step-based operation in the media processing on the cloud platform by at least processing, in parallel, the second plurality of segments based on boundaries between the second plurality of segments based on the metadata based segment boundary signaling and by a second processing of the step parameters of metadata of the second plurality of segments, and the second input media stream supports one of the metadata based segment boundary signaling or the code based segment boundary signaling.

5. A non-transitory computer readable medium storing instructions, the instructions comprising: one or more instructions that, when executed by at least one processor of an apparatus for performing a step-based operation in media processing on a cloud platform, cause the at least one processor to:
obtain a workflow including an input media stream, the input media stream comprising a plurality of segments, and the workflow is a network based media processing (NBMP) workflow;
generate a modified workflow by splitting the plurality of segments into a plurality of tasks for independent and parallel processing of the modified workflow;
perform the step-based operation in the media processing on the cloud platform by at least:
processing, in parallel, the plurality of segments based on boundaries between the plurality of segments, the boundaries based on metadata based segment boundary signaling or a code based segment boundary signaling, and
processing step parameters of metadata of the plurality of segments comprising at least a step-mode parameter, a segment-duration parameter, an operation-units parameter, a segment-metadata parameter, a segment-startcode parameter, a temporal-overlap parameter, and a number-of-dimension parameter, wherein:
the segment-metadata parameter indicates that if a value of the segment-metadata is set as true, then any of receiving and providing segment metadata for each media input/output of the input media stream to indicate the boundaries is supported, and if set as false, is not supported, and the default value of the segment-metadata parameter is false, and
the segment-startcode parameter indicates that if a value of the segment-startcode is set as true, then any of receiving and providing a startcode for each of the media input/output of the input media stream to indicate the segment boundaries is supported, and if set as false, is not supported, and the default value of the segment-startcode parameter is false;

merge outputs from processing the plurality of tasks of the modified workflow to generate an output media stream;

set a first flag corresponding to the metadata based segment boundary signaling and apply the metadata based segment boundary signaling to the output media stream;

set a second flag corresponding to the code based segment boundary signaling and apply the code based segment boundary signaling to the output media stream; and receive a code corresponding to each of the plurality of segments in the input media stream, the code comprising a startcode at a start of each segment to indicate the boundaries between the plurality of segments, the startcode being a NBMP step descriptor, and each time the code appears in the input media stream, the code indicates a boundary between adjacent segments.

* * * * *